(12) United States Patent
Cavazzini

(10) Patent No.: US 6,215,280 B1
(45) Date of Patent: Apr. 10, 2001

(54) PORTABLE OPTICAL CODE READER WITH A DEVICE FOR CONTROLLING THE CHARGE STATE OF THE READER BATTERY

(75) Inventor: Andrea Cavazzini, Bologna (IT)

(73) Assignee: Datalogic S.p.A. (IT)

( * ) Notice: Subject to any disclaimer, the term of this patent is extended or adjusted under 35 U.S.C. 154(b) by 0 days.

(21) Appl. No.: 09/192,267

(22) Filed: Nov. 16, 1998

(30) Foreign Application Priority Data

Nov. 17, 1997 (EP) .................................................. 97830606

(51) Int. Cl.[7] ............................ H02J 7/00; G01N 27/416
(52) U.S. Cl. ........................ 320/136; 320/134; 320/132; 324/432
(58) Field of Search ................................... 320/132, 130, 320/134, 107, 136; 324/427, 428, 432

(56) References Cited

U.S. PATENT DOCUMENTS

| | | | |
|---|---|---|---|
| 4,709,202 | * 11/1987 | Koenck et al. | 320/112 |
| 4,850,009 | 7/1989 | Zook et al. | |
| 5,065,084 | * 11/1991 | Yoshinori . | |
| 5,606,242 | * 2/1997 | Hull et al. | 320/106 |
| 5,892,971 | * 4/1999 | Danielson et al. | 395/827 |

FOREIGN PATENT DOCUMENTS

| | | |
|---|---|---|
| 602432 | * 6/1994 | (EP) . |
| 5-137274 | * 6/1993 | (JP) . |
| 5-189593 | * 7/1993 | (JP) . |

OTHER PUBLICATIONS

EPO Office Action issued 2/2000 for EPO Application No. 97 830 606.6.

* cited by examiner

Primary Examiner—Peter S. Wong
Assistant Examiner—Gregory J. Toatley, Jr.
(74) Attorney, Agent, or Firm—Hall, Priddy, Myers & Vande Sande

(57) ABSTRACT

A portable optical code reader, in particular for bar codes, having at least one supply battery; an electronic circuit with a microprocessor; and optoelectronic lighting and receiving devices cooperating with the microprocessor to read an optical code, in particular a bar code. The microprocessor also estimates the charge of the battery on the basis of the maximum charge storable in the battery, of measured recharge units supplied when recharging the battery, and of charge units estimated to have been consumed during operation of the reader.

20 Claims, 4 Drawing Sheets

PORTABLE OPTICAL CODE READER WITH A DEVICE FOR CONTROLLING THE CHARGE STATE OF THE READER BATTERY

BACKGROUND OF THE INVENTION

The present invention relates to a portable optical code reader with a device for controlling the charge state of the reader battery.

Portable optical code, in particular bar code, readers are known, which comprise a small hand-held outer casing (e.g. of elongated tubular shape, tapering at one end) housing an electronic circuit and a rechargeable, e.g. Ni—Cd, battery for supplying the electronic circuit. The reader also comprises a light source, e.g. a LED, for illuminating an optical code, e.g. a bar code BC; and a light sensor cooperating with the electronic circuit and for receiving the radiation diffused by the code. The light sensor receives the radiation diffused by successive adjacent portions of the code as the reader is moved manually with respect to the code, and so generates a signal modulated by the succession of different-coloured code elements (i.e. light and dark bars in the case of a bar code). The alternating signal is then processed by the electronic circuit to extract the alphanumeric information associated with the optical code. More specifically, known readers feature a display device (e.g. a liquid-crystal display), which cooperates with the electronic circuit to display the alphanumeric information read in the code.

Known readers also cooperate with a battery charger for charging the reader battery, which is normally done by connecting a portion (e.g. an end portion) of the reader fitted with supply electrodes to electrodes on the battery charger to generate recharge current from the battery charger to the rechargeable battery, which is normally recharged when the reader is not in use. As the reader is normally carried by a user moving about in an industrial environment, often some distance from the battery charger, a close check must be kept on the actual charge state of the reader battery to prevent the battery from running down completely while the reader is in use, and to recharge the battery as it gets low.

Since monitoring the actual state of the battery charge involves drawing current from the battery, the frequency with which the charge must be monitored may result in rapid discharge of the battery.

SUMMARY OF THE INVENTION

It is an object of the present invention to provide an optical code, in particular a bar code, reader featuring a device whereby the actual charge state of the reader battery may be checked frequently without drawing substantially any current from the battery.

According to the present invention, there is provided a portable optical code reader, in particular for bar codes, comprising: at least one supply source; an electronic circuit; and optoelectronic lighting and receiving means cooperating with said circuit to illuminate said optical code and pick up the light diffused by the optical code; characterized by comprising control means cooperating with said electronic circuit to estimate the charge in said supply source and give an indication of the actual charge state of the source.

A further object of the present invention is to provide an optical code reader, which provides for indicating the charge level of the battery in different operating modes of the reader. Many readers, in fact, are known to operate in different modes (device on with code reading, device on with no code reading, device on with display off, etc.) which correspond to different amounts of current being drawn from the battery.

According to the present invention, there is provided a reader wherein the calculating means comprise first calculating means for calculating first charge units estimated as consumed in a detected low-consumption operating state of said reader, in which said circuit is supplied and said optoelectronic lighting and receiving means are at rest; said first charge units being calculated on the basis of estimated values of the current drawn during operation in the low-consumption state, and on the basis of measured values of operating time intervals in the low-consumption state. The calculating means also comprise second calculating means for calculating second charge units estimated as consumed in a detected high-consumption operating state of said reader, in which said circuit is supplied and said optoelectronic lighting and receiving means are active; said second charge units being calculated on the basis of estimated values of the current drawn during operation in said high-consumption state, and on the basis of measured values of operating time intervals in the high-consumption state.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
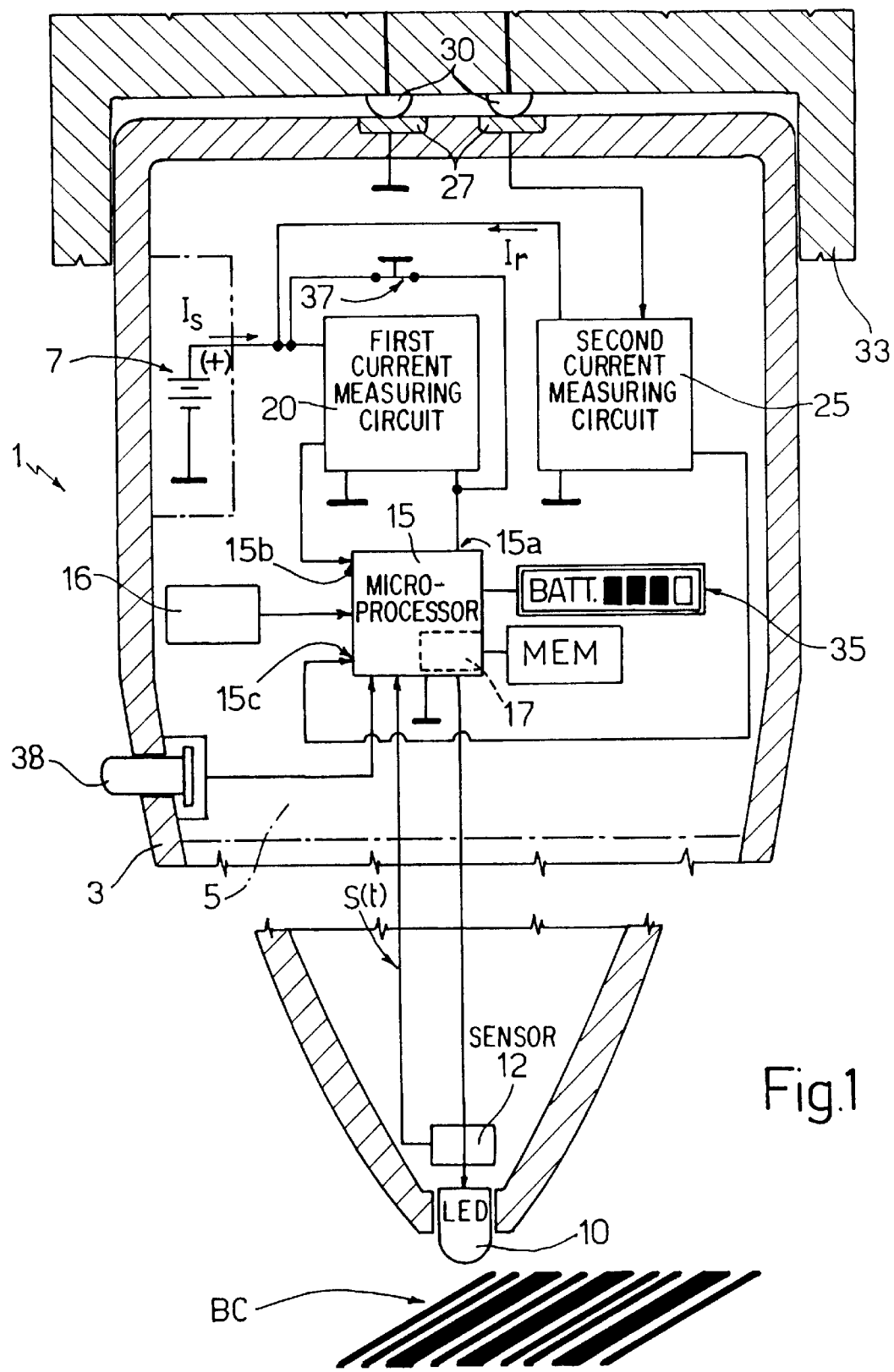
FIG. 1 shows a portable optical code reader, in particular for bar codes, equipped with a device for controlling the charge state of the reader battery in accordance with the teachings of the present invention.

Number 1 in FIG. 1 indicates as a whole a portable optical code reader comprising a small hand-held outer casing 3 (shown schematically) housing an electronic circuit 5 and a rechargeable supply source 7, e.g. a Ni—Cd (nickel-cadmium) battery. Reader 1 also comprises a light source 10, e.g. a LED, supplied by source 7 via circuit 5 for lighting an optical code, e.g. a bar code BC; and a light sensor 12 (made by a photodiode) cooperating with circuit 5 and for receiving the radiation diffused by the code. Light sensor 12 receives the radiation diffused by successive adjacent portions of the code as reader 1 is moved manually with respect to the code, and so generates a signal S(t) modulated by the succession of different-coloured code elements (e.g. light and dark bars in the case of a bar code).

Alternatively, light source 10 may comprise an array of LEDs (not shown) for uniformly lighting the whole code; and light sensor 12 may comprise a CCD or a linear sensor (not shown) cooperating with circuit 5 and for receiving the radiation diffused by the code. The linear sensor comprises successive elementary portions for receiving the radiation diffused by successive adjacent portions of the code, so that, by sequentially picking up the signals produced by the elementary portions of the linear sensor, it is possible to reconstruct an alternating signal from the succession of different-coloured code elements.

It is clear that reader 1, comprises generically speaking, a portable code reader for reading optical codes, bar codes, two-dimensional codes, colour codes, etc., which is supplied by a rechargeable supply source.

More specifically, electronic circuit 5 comprises:

a microprocessor 15 cooperating with a first circuit 16 for generating a first time reference (CLOCK), and with a second circuit 17 for generating a second time reference (FINE TIMER);

a first current measuring circuit 20 interposed between a supply input 15a of microprocessor 15 and the positive (+) supply terminal of battery 7, and which provides for generating measuring signals indicating the current Is flowing through it;

a second current measuring circuit 25 interposed between battery 7 and a supply input 27 of reader 1; supply input 27 being connectable to a positive-voltage source 30 generated by a battery charger 33 to supply battery 7 with recharge current Ir when reader 1 is connected to battery charger 33; and current measuring circuit 25 supplying a gate 15c of microprocessor 15 with signals correlated with recharge current Ir;

a switch 37 (normally-closed) interposed, parallel to first current measuring circuit 20, between the positive (+) supply terminal of battery 7 and supply input 15a of microprocessor 15; and a display device (alphanumeric display) 35 controlled by microprocessor 15 and for displaying information concerning the scanned alphanumeric code and the charge state of battery 7.

Microprocessor 15 provides for receiving and decoding (in known manner) electric signal S(t) to extract the alphanumeric information associated with the code; which information is also shown on display device 35.

Under the control of microprocessor 15, the reader operates in three different modes, each characterized by a respective amount of current drawn from the battery, namely:

a first operating mode in which circuit 5 is supplied and active, microprocessor 15 and light source 10 are off, and which corresponds to a low-consumption state in which a small amount of current is drawn from the battery;

a second operating mode in which circuit 5 is supplied and active, microprocessor 15 and light source 10 are on, and the display device at rest, and which corresponds to a high-consumption state in which a not negligible amount of current is drawn from the battery; in which connection, it should be pointed out that most (about eighty percent) of the current drawn by the reader is drawn by the microprocessor; and a third operating mode in which circuit 5 is supplied and active, microprocessor 15 and light source 10 are on, and the display device active, and which corresponds to a maximum-consumption state in which a high amount of current is drawn from the battery.

The present invention considers three current draw levels Ilow, Ihi, Ihi,disp in the first, second and third operating modes respectively. Currents Ilow, Ihi, Ihi,disp are measured only once at a calibration step, they are, then, permanently memorized in a memory (not shown) cooperating with microprocessor 15, and are used for the operations described later on. In other words, the estimate of currents Ilow, Ihi, Ihi,disp is in reality a measurement made only once and then memorized.

Said measurement may be made:

by means of sample measurements; or by means of real current measurements by current measuring circuit 20 at the calibration step.

The above three current values are thus determined precisely for each single reader recovering any possible spread or tolerances of the electronic components of each reader and may be updated at successive calibrations recovering any variations due to aging of the electronic components. The Ilow, Ihi, Ihi,disp values employed are therefore always updated accurate, real values ensuring a reliable estimate of the actual charge of the battery. Alternatively, the Ilow, Ihi, Ihi,disp values may be current values calculated on the basis of theoretical current draw models.

The control functions of the microprocessor circuit according to the present invention will now be described with reference to FIGS. 2a, 2b, 2c, 2d.

Figure 2A:
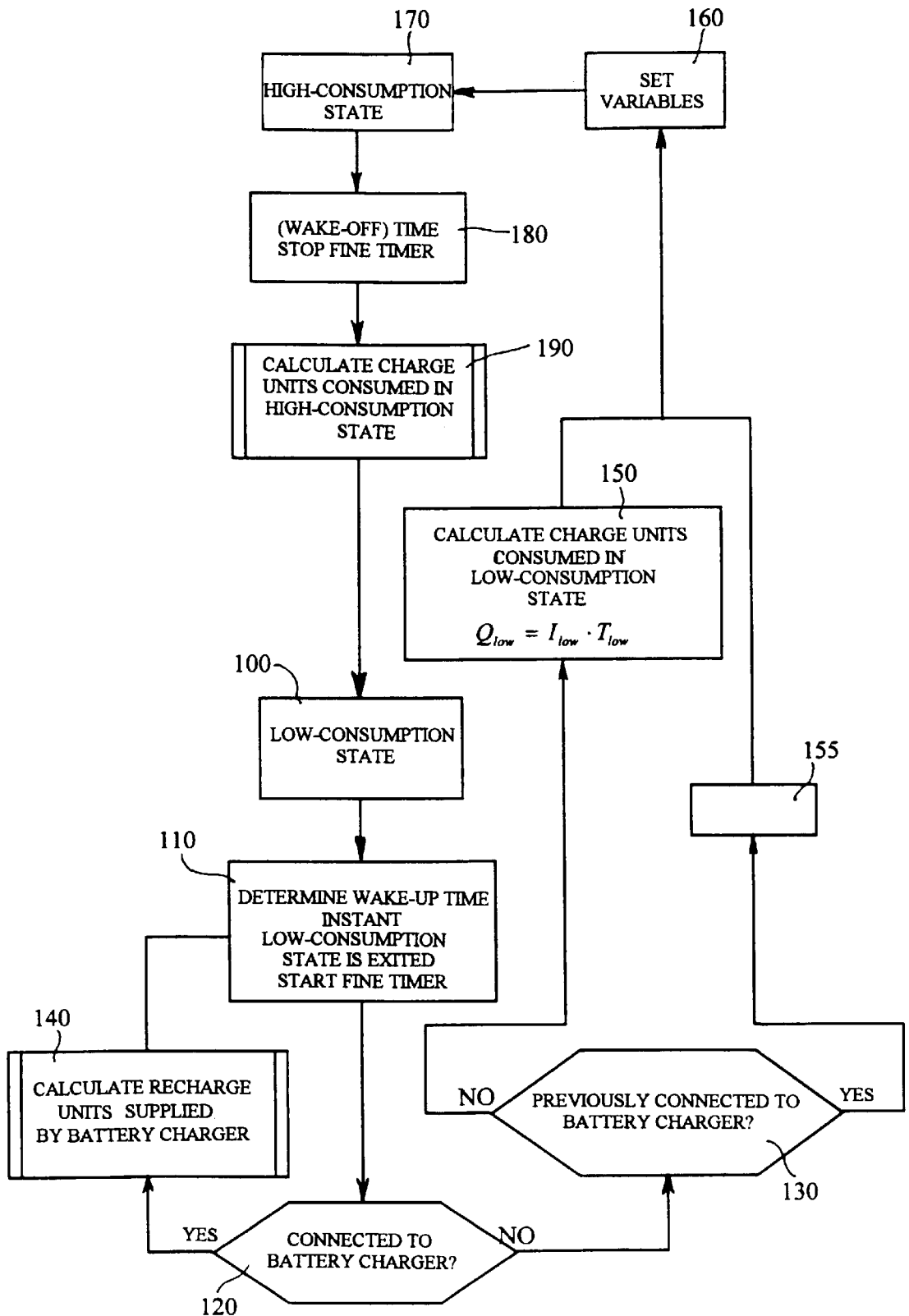
FIGS. 2a, 2b, 2c and 2d show logic operating diagrams of the reader according to the present invention.

FIG. 2a shows the operations performed by microprocessor 15 to estimate the charge state of battery 7 indirectly and directly.

Microprocessor 15 performs the operations shown schematically by block 100 when reader 1 is in a low-consumption state corresponding to the first operating mode, and which is exited mainly by two events:

pressing an enabling button 38 (FIG. 1) cooperating with microprocessor circuit 15 to set circuit 5 to the second operating mode (high-consumption state) in which the optical codes may be read and decoded; and connecting reader 1 to battery charger 33.

On exiting the low-consumption state, block 100 is followed by a block 110, which determines the instant ((wake-up)time) in which the low-consumption state is exited, i.e. the instant in which the first operating mode is terminated, and which is determined by circuit 16. Block 110 also provides for starting (START) circuit 17, which operates as a counter (fine timer) for measuring the time lapse after the low-consumption state is exited. The time measurement made by the circuit 17 counter is more precise than that made by circuit 16. For example, the circuit 17 counter may operate to a tenth of a second, while circuit 16 measures in minutes.

Block 110 is followed by a block 120, which determines whether reader 1 is currently connected to battery charger 33. In the event of a negative response, i.e. indicating the low-consumption state was exited by pressing enabling button 38, block 120 goes on to a block 130. Conversely, in the event of a positive response in block 120, i.e. indicating the low-consumption state was exited by reader 1 being connected to battery charger 33, block 120 goes on to a block 140.

Block 140 (detailed later on) calculates a number of recharge units representing the charge supplied by the battery charger to the battery, when recharging the battery. Block 140 is followed by block 110.

Block 130 determines whether reader 1 was previously connected to battery charger 33. In the event of a negative response, i.e. indicating the low-consumption state 100 was exited by pressing enabling button 38, block 130 goes on to a block 150. Conversely, in the event of a positive response, indicating that reader 1 was previously connected to battery charger 33, block 130 goes on to a block 155 (detailed later on).

Block 150 calculates first charge units Qlow estimated to have been consumed while reader 1 was in low-consumption state 100; the charge units Qlow, being equivalent, via the voltage of the supply source, to the energy consumed in the low-consumption state to supply circuit 5, are calculated as the product of the memorized value of current Ilow drawn by circuit 5 in the low-consumption state, and the measured time Tlow=(wake-up)time−(wake-off)time in which reader 1 was in the low-consumption state, i.e.:

$$Qlow = Ilow \cdot Tlow$$

where (wake-up)time is the instant, determined by block 110, in which the low-consumption state was exited; and (wake-off)time is the instant in which low-consumption state 100 is entered (detailed later on).

First charge units Qlow relative to the charge consumed in the low-consumption state are also accumulated, with a negative sign, in a memory MEM (FIG. 1) cooperating with microprocessor 15.

Block 150 is followed by a block 160, which provides for setting a set of high-consumption-state variables.

Block 160 is followed by a block 170, which represents a high-consumption state corresponding to the second and third operating mode, and which is exited by releasing (or again pressing) button 38. On exiting the high-consumption state, block 170 goes on to a block 180, which stops counter circuit 17 to terminate the measurement, with a high degree of accuracy, of the time Thi in which reader 1 was in high-consumption state 170. Block 180 also determines the instant ((wake-off)time) in which the high-consumption state was exited, and which substantially coincides with the instant in which the low-consumption state is entered. As already stated, the (wake-off)time instant is used to calculate the charge units in block 150.

Block 180 is followed by a block 190, which calculates second charge units Qhi estimated to have been consumed while reader 1 was in high-consumption state 170, and which represent the charge consumed in the high-consumption state.

Block 190 is followed by block 100 (low-consumption state), entry of which is determined by block 180.

Figure 2C:
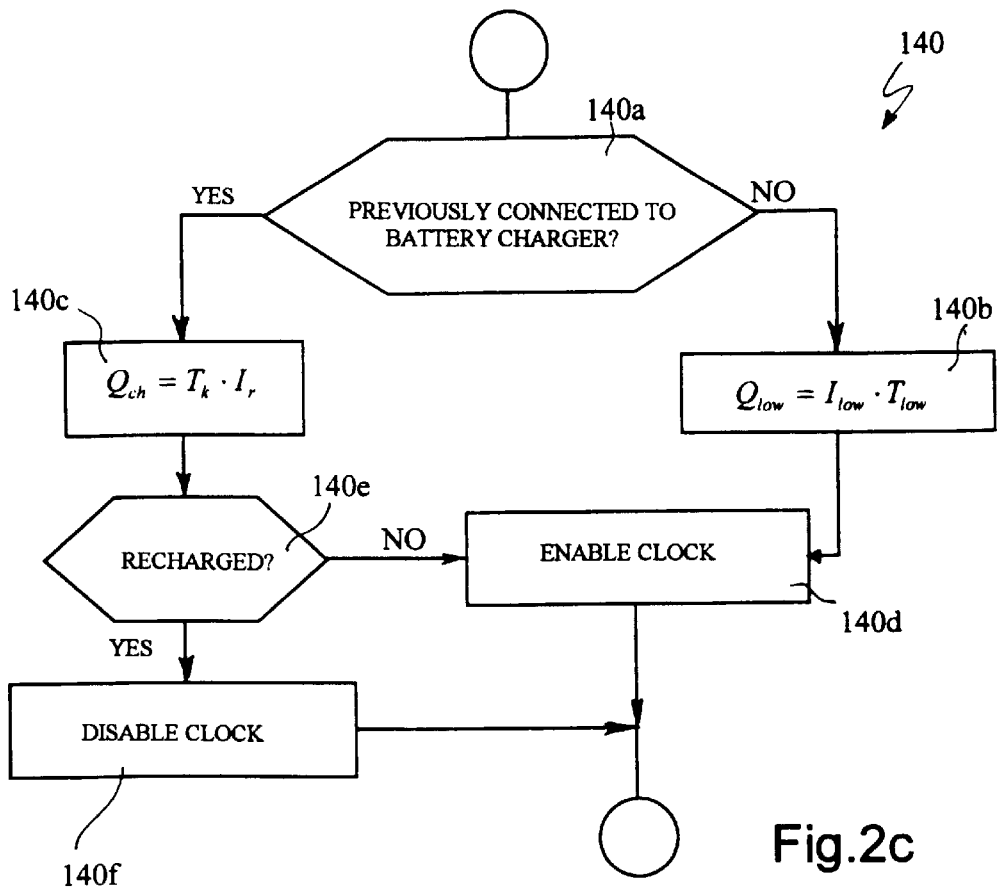
Figure 2B:
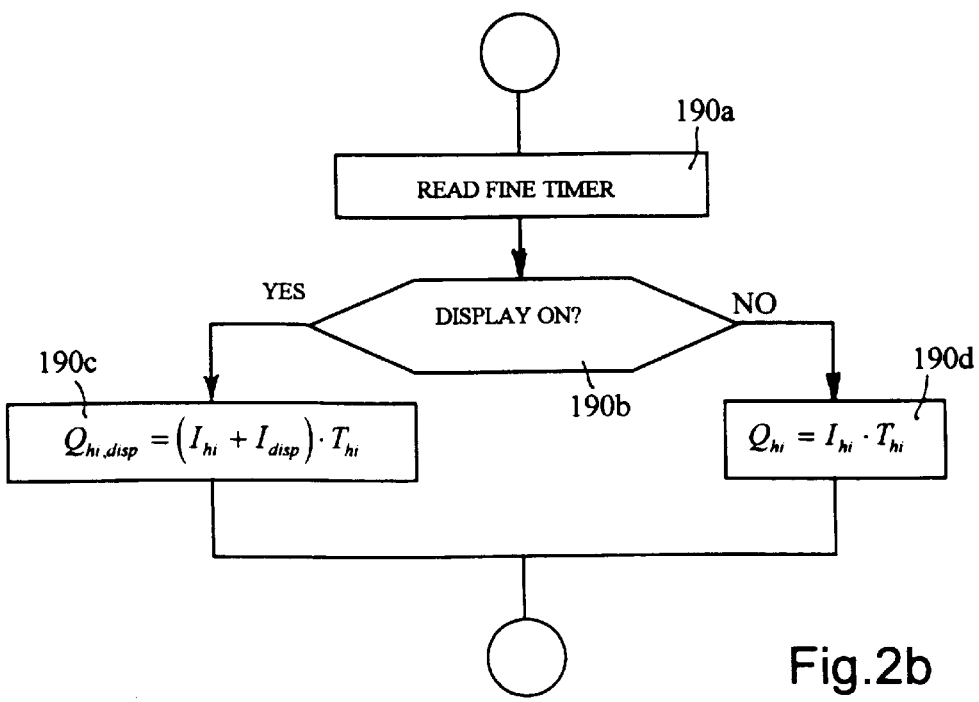

FIG. 2b shows a detail of block 190 for calculating the charge units Qhi estimated to have been consumed during high-consumption-state operation of reader 1.

Block 190 comprises a block 190a for reading the time value measured by counter 17, i.e. the interval in which circuit 5 was in the high-consumption state. Block 190a is followed by a block 190b for discriminating between two operating modes: a first mode in which reader 1 has operated with display device 35 on and a second mode in which reader 1 has operated with display device 35 off. If the first operating mode has been implemented, a block 190c is selected to calculate an estimated value of charge units Qhi,disp consumed while reader 1 was in the high-consumption state with display device 35 on; which charge units Qhi,disp are calculated as the product of the memorized value of the current Ihi +Idisp drawn respectively by circuit 5 and display 35 in the high-consumption state, and time Thi, i.e.:

$$Qhi,disp=(Ihi+Idisp)\cdot Thi$$

Charge units Qhi,disp represent the charge consumed in the high-consumption state to supply circuit 5 and display device 35.

If the second operating mode has been implemented, a block 190d is selected to calculate an estimated value of charge units Qhi consumed while reader 1 was in the high-consumption state with display device 35 off; which charge units Qhi are calculated as the product of the memorized value of the current Ihi drawn by reader 1 in the high-consumption state, and time Thi, i.e.:

$$Qhi=Ihi\cdot Thi$$

Charge units Qhi represent the charge consumed in the high-consumption state to supply reader 1.

Second charge units Qhi, Qhi,disp representing the charge consumed in the high-consumption state are also accumulated, with a negative sign, in memory MEM (FIG. 1).

Blocks 190c and 190d go back to block 100.

With reference to FIG. 2c, block 140 comprises a first block 140a for determining whether reader 1 was previously connected to battery charger 33. In the event of a negative response (i.e. when the check in block 140a is performed for the first time following connection of reader 1 to battery charger 33), block 140a goes on to a block 140b. Conversely, in the event of a positive response in block 140a, i.e. when the check in block 140a is performed for the second time (and any time after the second) following connection of reader 1 to battery charger 33, block 140a goes on to a block 140c.

Like block 150, block 140b calculates first charge units Qlow estimated to have been consumed while reader 1 was in the low-consumption state; which charge units Qlow are calculated as the product of the memorized value of the current Ilow drawn by circuit 5 in the low-consumption state, and the time Tlow=(wake-up)time−(wake-off)time measured by circuit 16 and indicating the interval in which reader 1 was in the low-consumption state, i.e.:

$$Qlow=Ilow\cdot Tlow$$

where (wake-up)time is the instant, determined by block 110, in which the low-consumption state is exited and (wake-off)time is the instant, determined by block 180, in which low-consumption state 100 is entered.

First charge units Qlow, representing the charge consumed in the low-consumption state to supply circuit 5, are also accumulated, with a negative sign, in memory MEM (FIG. 1) as for block 150.

Block 140b is followed by a block 140d for enabling a clock, which, at the end of a predetermined interval Tk from when it is enabled, allows block 140a to select block 140c. In other words, as opposed to being performed as soon as block 140 is selected (i.e. when reader 1 is connected to battery charger 33), the operations in block 140c are performed after a time Tk from connection of reader 1 to battery charger 33, and are performed periodically every Tk seconds, at "wake-up" instants of the microprocessor.

At the instants at which times Tk are established, i.e. at which the microprocessor "wakes up", reader 1 is in the high-consumption state. As charging is in progress, however, in this state, and the "wake-up" instants of the microprocessor are very small, this high consumption may be considered negligible, and the charge consumed in the high-consumption state is not calculated.

Block 140c calculates the recharge units Qch supplied while reader 1 is connected to battery charger 33; which recharge units Qch represent the charge supplied while reader 1 is connected to battery charger 33 to recharge battery 7, and are calculated as the product of the current Ir (measured by circuit 25) drawn by battery 7 as it is being recharged, and time Tk, i.e.:

$$Qch=Tk\cdot Ir$$

When calculated, the supplied recharge units Qch are gradually accumulated, with a positive sign, in memory MEM, in which are also accumulated (with a negative sign) the first charge units Qlow consumed in the low-consumption state, and the second charge units Qhi,disp and Qhi consumed in the high-consumption state. Memory MEM therefore contains the resulting algebraic sum Qtot of recharge units Qch, first charge units Qlow, and second charge units Qhi,disp and Qhi, i.e.:

$$Qtot=Qch-Qlow-Qhi,disp-Qhi$$

The supplied recharge units Qch are calculated on the basis of a measured time and a current measured directly by circuit 25, while the charge units Qlow, Qhi,disp and Qhi estimated to have been consumed in the low- and high-consumption state are calculated on the basis of measured times and currents estimated or measured only once at the calibration step. The algebraic sum Qtot is therefore given by the composition of quantities measured directly, and quantities estimated or measured only once at the calibration step.

Block 155 performs the same operation as in block 140c, to calculate the recharge units added between the last "wake-up" of the microprocessor and disconnection of reader 1 from battery charger 33; which recharge units are also accumulated in memory MEM, and block 155 then goes on to block 160.

Block 140c is followed by a block 140e, which determines whether the recharge current Ir measured by circuit 25 has fallen below a given threshold value, on account of battery 7 being fully recharged. In the event of a positive response (battery 7 fully recharged), block 140e goes on to a block 140f, which disables the clock enabled in block 140d, to prevent any further recharge units being added in memory MEM, in that the battery is no longer physically capable of storing any further charge. Conversely, if battery 7 is not fully recharged, block 140e is followed by block 140d.

Microprocessor 15 makes a periodic check of memory MEM, which, as stated, contains the algebraic sum Qtot of the recharge units Qch (positive) supplied to recharge the battery, and the charge units Qlow, Qhi,disp and Qhi (negative) drawn from the battery by reader 1 operating in said three operating modes. Algebraic sum Qtot therefore represents the actual charge of battery 7, equivalent to the balance between the charge supplied at the recharge step and the charge consumed to supply reader 1 in various operating modes.

A negative logic, i.e. considering recharge units Qch negative and charge units Qlow, Qhi,disp and Qhi positive, would of course achieve the same result as regards calculation of algebraic sum Qtot.

Microprocessor circuit is also provides for calculating the percentage ratio Qtot/Qm between the actual charge Qtot and the maximum storable charge Qm in battery 7 reached at the end of a complete battery recharge cycle which percentage ratio Qtot/Qm represents the residual or actual charge of battery 7. Ratio Qtot/Qm represents an estimate (terms Qlow, Qhi and Qhi,disp are estimated) of the charge of battery 7, and gives an indication of the actual charge state of the battery.

The percentage ratio may be shown on display device 35 in the form of a number, or in known graphic form, e.g. a number of packed parallel bars, the gradual extinction of which indicates a fall in the percentage ratio and discharge of the battery.

In a first embodiment, the maximum charge Qm storable in the battery may be set by means of a fixed number determined according to the characteristics of the battery 7 used. On account of the inevitable tolerances involved, however, the battery electric characteristics of individual readers differ from the nominal ones, and also vary during the working life of the battery. The so-called "memory effect" of nickel-cadmium batteries, for example, results in the maximum charge storable in the battery being reduced at successive recharge cycles in the course of the working life of the battery.

It is therefore preferable to provide a procedure by which to directly measure the maximum charge Qm storable in the battery.

Figure 2D:
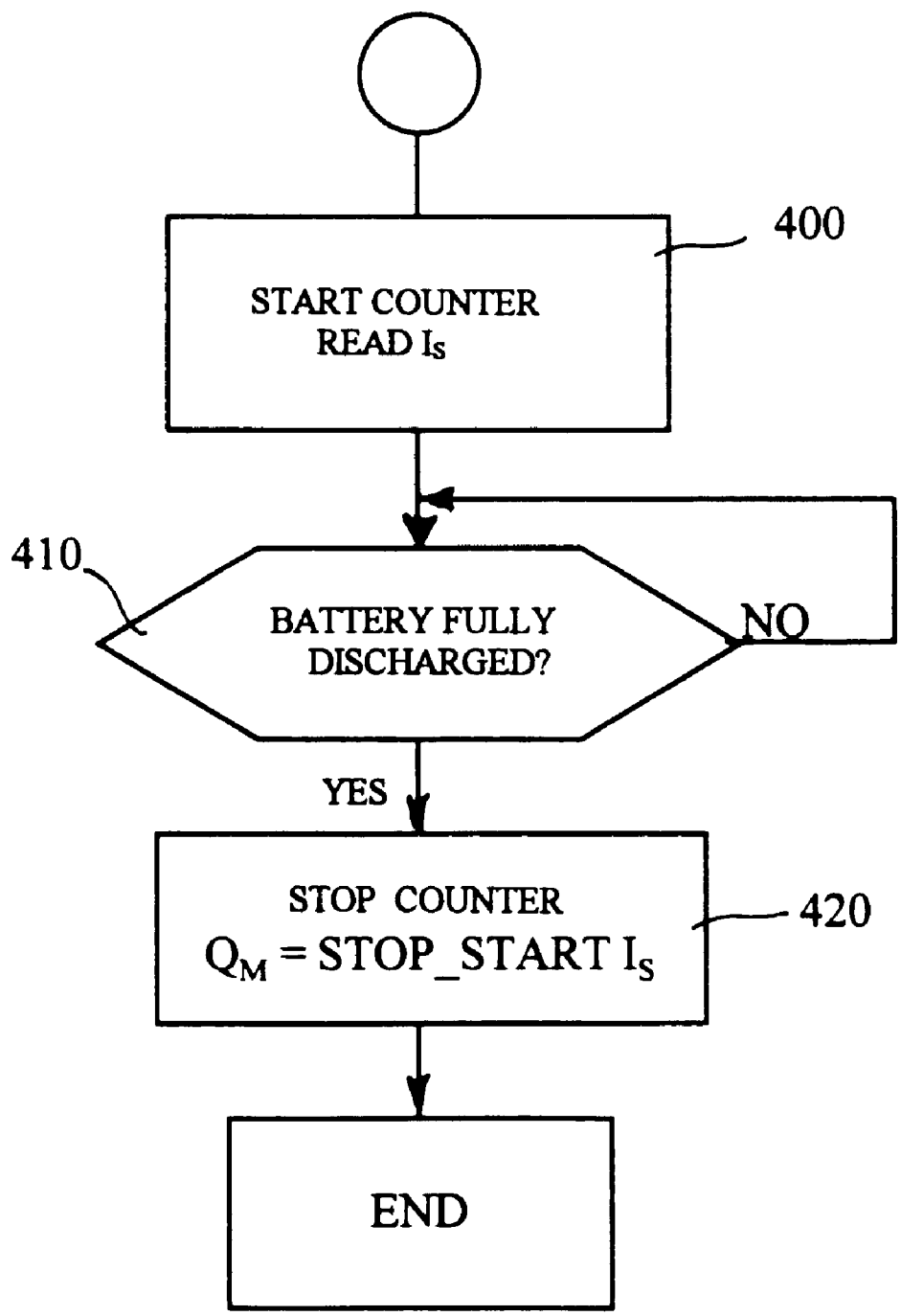

FIG. 2d shows a procedure for directly measuring the maximum charge Qm storable in the battery according to the present invention.

The operations shown in FIG. 2d are performable when the battery is fully recharged, e.g. on exiting block 140e (FIG. 2c) determining full recharge of battery 7.

To begin with, a block 400 provides for starting a (previously reset) counter (e.g. defined by circuit 16), and for supplying circuit 5 with a current draw (Is) from battery 7. Block 400 is also enabled when switch 37 is open, i.e. when circuit 5 is supplied via current measuring circuit 20, so that the current Is drawn by circuit S and by microprocessor 15 is measured directly. With similar procedures, currents Ilow, Ihi and Ihi,disp may be measured and subsequently memorized at the calibration step.

Block 400 is followed by a block 410, which awaits complete discharge of battery 7.

When battery 7 is fully discharged, block 410 goes on to a block 420, which stops the counter enabled in block 400, reads the content STOP_START of the counter representing the time taken to fully discharge battery 7, and calculates the maximum charge Qm storable in the battery as the product of battery discharge time STOP_START and the current Is drawn during discharge of the battery, i.e.:

$$Qm = \text{STOP\_START} \cdot Is$$

The advantages of the present invention are clear from the foregoing description. In particular, the invention provides for continually indicating the actual charge state of the rechargeable battery of an optical code reader. The charge is measured indirectly on the basis of the current (estimated or measured only once at the calibration step) drawn in various operating modes, as opposed to measuring the currents directly—which inevitably involves drawing a certain amount of charge—and so further discharging the battery as stated in the introduction. Moreover, reader 1 employs the same microprocessor used to read and decode the code, and shows the results on the display device normally used to display the code reading, thus requiring no additional parts or elements.

What is claimed is:

1. An optical code reader comprising:

an opto-electronic light source capable of illuminating portions of an optical code;

a sensing means capable of sensing light diffused or reflected by an optical code;

an electronic circuit capable of communicating with said opto-electronic light source and said sensing means thereby to read an optical code, wherein said electronic circuit includes a control means including a timing means for generating a time reference value;

a rechargeable power supply source for supplying power to said optical code reader as charge units, said rechargeable power supply having a maximum charge unit storage limit;

wherein said optical code reader includes multiple operating modes corresponding to multiple power consumption rates, said power consumption rates being stored as power consumption values in a memory; and wherein during operation, in each of said operating modes, said timing means generates a time reference value corresponding to a measured mode operating time interval for each of said operating modes, said time reference values thereafter being utilized in conjunction with said power consumption values stored in said memory to estimate the charge units remaining in said rechargeable supply source without drawing current from said rechargeable supply source.

2. The optical code reader of claim 1 wherein said power consumption rates are determined and stored in said memory as said power consumption values during a calibration step.

3. The optical code reader of claim 1 wherein said control means further includes a calculating means for calculating an estimated number of charge units consumed during operation of said optical code reader, said calculating means utilizing said time reference values and said power consumption values in making said calculations; and wherein said control means is capable of comparing said estimated number of consumed charge units to said maximum charge unit storage limit thereby to provide an indication of an estimation of the actual charge state of the rechargeable power supply source.

4. The optical code reader of claim 3 wherein said multiple operating modes include a high power consumption mode having a high power consumption rate stored in said memory as a high power consumption value during which said optoelectronic light source and said sensing means are active;

and wherein an estimated number of charge units consumed in said high power consumption mode is calculated by said calculating means utilizing the product of said stored high power consumption value and the corresponding said measured time reference value.

5. The optical code reader of claim 3 wherein said calculating means calculates said estimated number of charge units consumed as the product of said time reference values and the respective said power consumption values.

6. The optical code reader of claim 3 wherein said multiple operating modes include a low-power consumption mode having a low-power consumption rate stored in said memory as a low-power consumption value during which said opto-electronic light source and said sensing means are at rest;

and wherein an estimated number of charge units consumed in said low-power consumption mode is calculated by said calculating means utilizing the product of said stored low-power consumption value and the corresponding said measured time reference value.

7. The optical code reader of claim 6 further including a detecting means for detecting an exit from said low-power consumption mode to a different power consumption mode.

8. The optical code reader of claim 3 further including a display means capable of displaying information; and a discriminating means capable of determining whether said display means is active in the current operating mode;

wherein said multiple operating modes include a maximum-power consumption mode having a maximum-power consumption rate stored in said memory as a maximum-power consumption value during which said display means is active; and wherein in the event said display means is determined to be active therefore indicating entry into said maximum-power consumption mode, an estimated number of charge units consumed in said maximum-power consumption mode is calculated by said calculating means utilizing the product of said stored maximum-power consumption value and the corresponding said measured time reference value.

9. The optical code reader of claim 4 wherein said timing means comprises a first and second clock means;

said first clock means provided for measuring said mode operating time intervals in said low-power consumption state; and said second clock means provided for measuring said mode operating time intervals in said high-power consumption state, said second clock means having a greater resolving time than said first clock means.

10. The optical code reader of claim 3 further including a recharging mode during which said rechargeable power supply source is supplied with charge units from a battery charger and said calculating means is capable of determining an estimation of the actual charge state of the rechargeable power supply source;

wherein during said charge estimation step, said calculating means calculates the charge state of said rechargeable power supply source utilizing the measured values of said charge units supplied by said battery charger and the estimated numbers of said charge units consumed during operation.

11. The optical code reader of claim 10 wherein said control means provides for adding, with opposite signs, the values of said charge units supplied during said recharging step to the values of said charge units consumed during operation, thereby to calculate an estimate of the actual charge contained in said rechargeable power supply source.

12. The optical code reader of claim 10 further including a detecting means for determining when said rechargeable power supply source has reached said maximum charge unit storage limit.

13. The optical code reader as claimed in claim 10 further including a detecting means for detecting an exit from said low-power consumption mode to a different power consumption mode, said detecting means further providing for detecting the start of said recharging step and for sequentially enabling said calculating means for calculating the number of said charge units consumed during said low-power consumption state and for calculating the number of said charge units supplied during said recharging step.

14. The optical code reader of claim 3 wherein said calculating means includes means for calculating the maximum charge storable in said rechargeable power supply source.

15. The optical code reader of claim 14 wherein said means for calculating the maximum charge comprises:

a cycle start means which is enabled when the rechargeable power supply source reaches its maximum limit;

a discharging means for discharging said rechargeable power supply source by feeding a discharge current to a load, said load being defined by said electronic circuit;

a measuring means for measuring said discharge current;

a detecting means for determining when said rechargeable power supply source has been completely discharged;

a clock means for determining the duration of the discharge interval of said rechargeable power supply source; and a discharge calculating means which is enabled when said rechargeable power supply source has been completely discharged and which calculates the value of maximum charge storable based on the value of said discharge current and said discharge interval.

16. An optical code reader comprising:

an opto-electronic light source capable of illuminating portions of an optical code;

a sensing means capable of sensing light diffused or reflected by an optical code;

an electronic circuit capable of communicating with said opto-electronic light source and said sensing means thereby to read an optical code, wherein said electronic circuit includes a control means;

a rechargeable power supply source for supplying power to said optical code reader as charge units, said rechargeable power supply having a maximum charge unit storage limit;

wherein said optical code reader includes at least one operating mode corresponding to a power consumption rate, said power consumption rate being stored as power consumption value in a memory; and wherein during operation, in said operating mode, said power consumption value stored in said memory is utilized to estimate the charge units remaining in said rechargeable supply source without drawing current from said rechargeable supply source.

17. The optical code reader of claim 16 wherein said control means further includes a measuring means for measuring the value of current supplied to said recharge power supply source in the course of recharging said rechargeable power supply source, thereby to aid in estimating the number of charge units contained in said rechargeable power supply source.

18. The optical code reader of claim 16 wherein said control means comprises a microprocessor means for decoding an electric signal from said sensing means which is derived from a scan of an optical code.

19. The optical code reader of claim 16 wherein said rechargeable power supply source comprises at least one rechargeable battery.

20. The optical code reader of claim 12 wherein said power consumption values are measured only once during said calibration step and are thereafter memorized permanently.

* * * * *